United States Patent [19]

Hyoi

[11] Patent Number: 5,182,587
[45] Date of Patent: Jan. 26, 1993

[54] EYEGLASS FRAME HAVING ANTIROTATION CONNECTION

[75] Inventor: Isao Hyoi, Fukui, Japan

[73] Assignee: Murai Co., Ltd., Fukui, Japan

[21] Appl. No.: 543,841

[22] PCT Filed: Nov. 18, 1988

[86] PCT No.: PCT/JP88/01172
§ 371 Date: Jul. 17, 1990
§ 102(e) Date: Jul. 17, 1990

[87] PCT Pub. No.: WO90/05936
PCT Pub. Date: May 31, 1990

[51] Int. Cl.⁵ ............................................. B02C 5/02
[52] U.S. Cl. .................................. 351/124; 351/140
[58] Field of Search ............... 351/41, 121, 124, 140, 351/154, 129, 111, 116, 149, 141

[56] References Cited

FOREIGN PATENT DOCUMENTS

58213/88 4/1988 Japan.
60122/88 4/1988 Japan.
214716/88 9/1988 Japan.

Primary Examiner—Rodney B. Bovernick
Attorney, Agent, or Firm—Armstrong, Westerman, Hattori, McLeland & Naughton

[57] ABSTRACT

The present invention relates to eyeglasses and, more particularly, to eyeglasses made of an NT alloy. In an eyeglass frame, an anti-rotation groove (12) is formed at an end of a member to be joined, and an engagement tube (13) having an inner threaded periphery is secured to the periphery of the groove (12), joined with engagement portions (8) and (9) of a rim (2), and secured to them by securing means. The bridge and bar of the eyeglass frame having the above-described arrangement are connected to each other by means of the engagement tubes. With this arrangement, it is possible to prepare a variety of parts in advance and easily replace various parts in compliance with the demands of users.

1 Claim, 2 Drawing Sheets

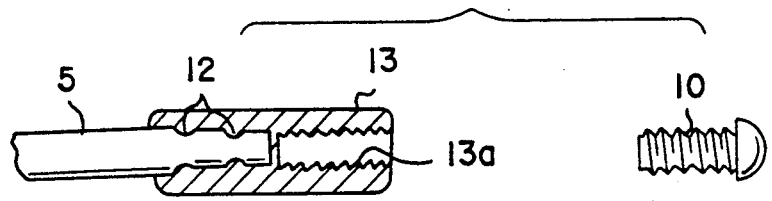
FIG.6
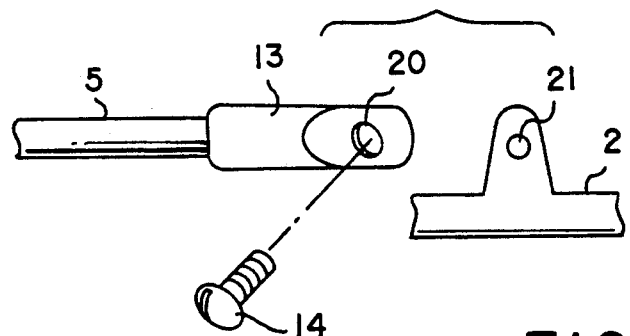
FIG.7
FIG.8A
PRIOR ART
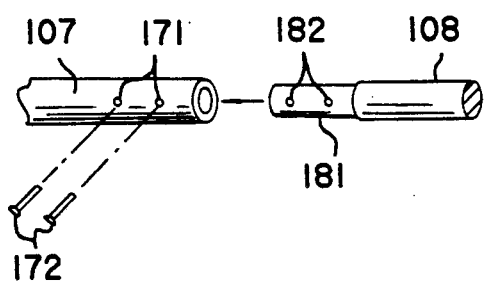
FIG.9
PRIOR ART
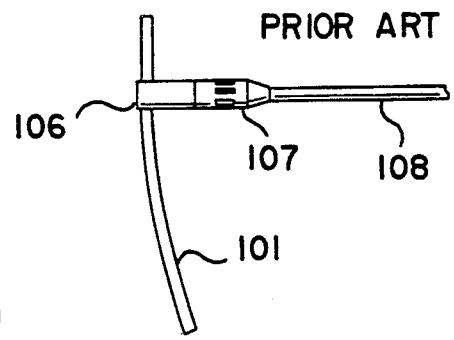
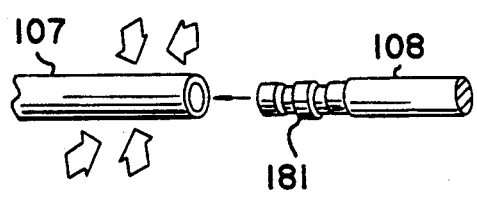
FIG.8B    PRIOR ART

EYEGLASS FRAME HAVING ANTIROTATION CONNECTION

TECHNICAL FIELD

The present invention relates to an eyeglass frame made of a material which is extremely difficult to work, for example, an NT alloy (shape memory alloy).

BACKGROUND ART

A conventional eyeglass frame of this type is disclosed in Japanese Patent Laid-Open No. Sho. 63-58213, as shown in FIGS. 8 and 9.

Referring to FIG. 8, one end of an end piece 106 which projects from a lens frame 101 is formed as an engagement tube 107, and pin holes 171 are formed in the engagement tube 107 and pin holes 182 are also formed in an engagement stem 181 which projects from the proximal end of a temple 108. The engagement stem 181 of the temple 108 is inserted into the engagement tube 107, and pins 172 are inserted through the commensurate pin holes 171 and 182 of the respective members, and the ends of the pins 172 are secured to the temple 108 by pinching as required. This state is shown in FIG. 8(A).

As shown in FIG. 8(B), after the distal end of the temple 108 has been inserted into the engagement tube 107, the temple 108 may be secured by press-fitting the engagement tube 107.

However, the above-described prior art has the problem that the temple 108 and the engagement tube 107 are difficult to drill or thread and costs increase. In particular, with a process utilizing the threading of an NT alloy (a nickel titanium alloy) material, it is impossible to mass-produce eyeglass frames in practice.

In particular, if parts are damaged when eyeglass parts are fused with an eyeglass frame, repair is difficult.

The NT alloy material also has the problem that, when subjected to cutting such as threading or drilling, the material is easily damaged.

DISCLOSURE OF THE INVENTION

The object of the present invention is to solve the above-described problems experienced with the prior art. An anti-rotation groove is formed at one end of an NT-alloy member to be joined, and an engagement tube having an inner threaded periphery is fixed to the periphery of the groove, joined with an engagement portion, and secured in position by a screw. With this arrangement, since it is not necessary to directly thread the eyeglass frame made of a material which is extremely difficult to work, for example, an NT alloy, such eyeglass frames can be easily manufactured and the mass production thereof is enabled.

In addition, if eyeglass parts of various designs which differ in length or thickness are prepared as bridges or bars to be secured to rims, eyeglass parts of various designs which differ in color, thickness or size can be supplied in compliance with the demands of various users. It is also possible to freely select the hardness of a front.

BRIEF DESCRIPTION OF THE DRAWINGS

FIG. 6 is a cross-sectional view of a first embodiment of the eyeglass frame according to the present invention;

FIG. 7 is a side view of a second embodiment of the eyeglass frame according to the present invention;

FIG. 8(A) and 8(B) are an explanatory view of a prior art; Part (A) is a view illustrating connection utilizing pins, while Part (B) is a view illustrating connection utilizing pinching; and FIG. 9 is a side view of an eyeglass frame according to the prior art.

BEST MODE FOR CARRYING OUT THE INVENTION

Figure 1:
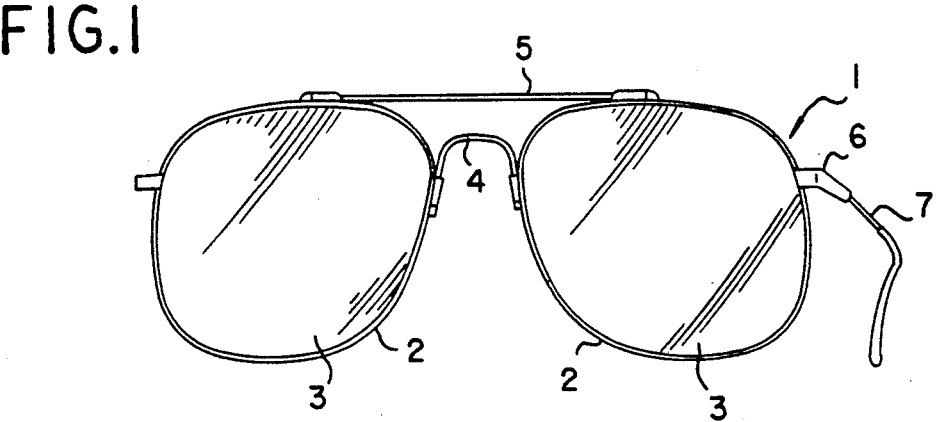
FIG. 1 is a front elevational view of an eyeglass frame according to the present invention.

An embodiment of the present invention will be described below with reference to the accompanying drawings. FIG. 1 is a front view of an eyeglass frame according to the present invention, and the eyeglass frame is indicated generally at 1. The eyeglass frame 1 comprises a pair of right and left rims 2, and the rims 2 support lenses 3, respectively. The rims 2 for supporting the respective lenses 3 are connected by a bridge 4 which is a member to be joined. In order to reinforce the connection between the pair of right and left rims 3 provided by the bridge 4, a bar 5 which is another member to be joined is secured to the top portions of the respective rims 3. A temple 7 is secured to a side portion of each of the rims 3 by means of a corresponding side joint 6.

Figure 2:
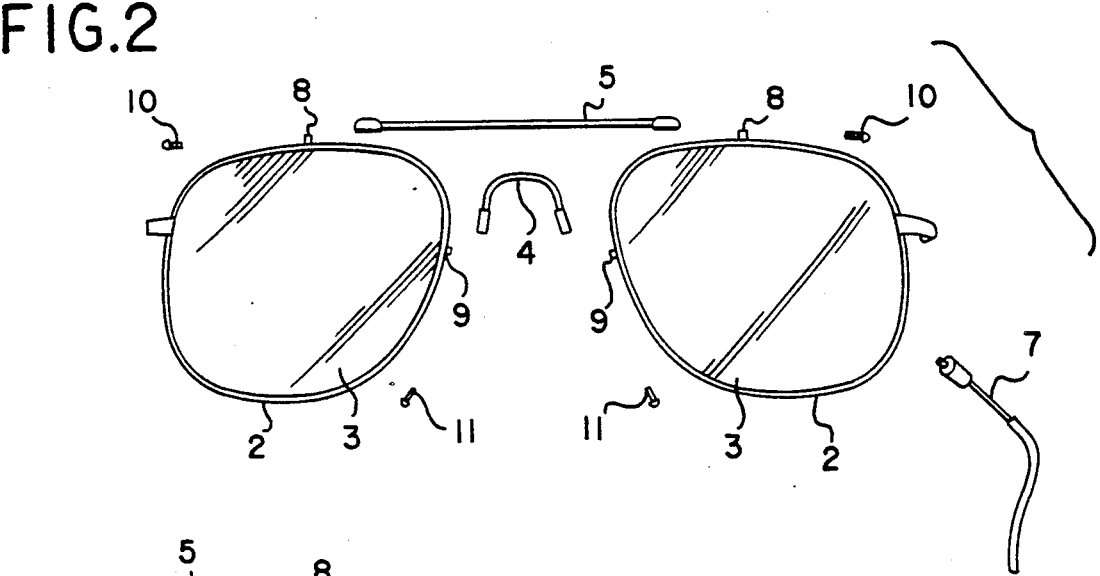
FIG. 2 is an exploded explanatory view of the eyeglass frame according to the present invention.
Figure 3:
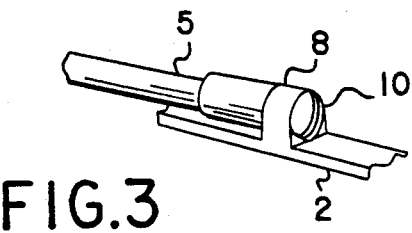
FIG. 3 is an enlarged view of the connection between a bar and a rim of the eyeglass frame according to the present invention.

FIG. 2 is an exploded explanatory view of the eyeglass frame 1 to clarify the arrangement of the aforesaid eyeglass frame 1. In FIG. 2, reference numeral 8 denotes a bar engagement portion for securing the bar 5, reference numeral denotes a bridge engagement portion for securing the bridge 4, and reference numerals 10 and 11 respectively denote screws for securing the bar 5 to the upper portions of the respective rims 2 and the bridge 4 to the inner portions of the respective rims 2.

The connections between the bar 5 and the engagement portions 8 and those between the bridge 4 and the engagement portions 9 will now be explained in further detail. Referring to FIG. 6, there is one end of the bar 5. As can be seen from the figure, anti-rotation or anti-slippage grooves 12 are formed at the end of the bar 5. An engagement tube 13 formed of nickel silver or the like is fitted onto the outer periphery of that end, and the periphery of the engagement tube 13 is pinched and secured to the end.

A female thread 13a is formed around the inner periphery of the engagement tube 13. When the bar 5 which is arranged in the above-described manner is to be brought into engagement with the engagement portions 8, the opposite ends of the bar 5 are placed at the respective engagement portions 8. Then, after the axes of the female threads 13a of the respective engagement tubes 13 secured to the opposite ends of the bar 5 are made to coincide with the axes of the respective engagement portions 8, the engagement tubes 13 are secured to the corresponding engagement portions 8 by means of the screws 10.

Figure 5:
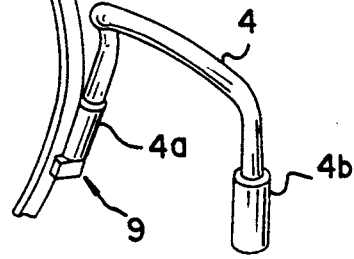
FIG. 5 is a perspective view of a bridge of the eyeglass frame according to the present invention.

The manner in which the bridge 4 is secured to the inner sides of the respective rims 2 will be explained with reference to FIG. 5. Engagement tubes 4a and 4b are inserted into the opposite ends of the bridge 4, and the engagement tubes 4a and 4b are secured to the opposite ends of the bridge 4 by externally pinching the engagement tubes 4a and 4b. The engagement portions 9 of the inner sides of the respective rims 2 have inner threads.

Then, the axes of the respective engagement tubes 4a and 4b of the opposite ends of the bridge 4 are made to coincide with the axes of the corresponding engagement portions 9, and the bridge 4 is secured to the inner portions of the respective rims 2 by tightening the opposite ends of the bridge 4 by the screws 11.

Figure 4:
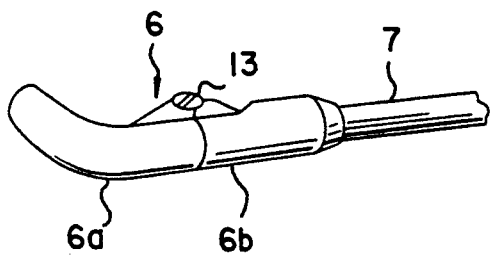
FIG. 4 is a partial enlarged view of a side joint according to the present invention.

A method of connecting each of the side joints 6 to the temple 7 will be explained with reference to FIG. 4. Each of the side joints 6 consists of halves 6a and 6b, and the half 6a is secured to the outer portion of the rim 2, while the half 6b and the temple 7 are connected to each other. Threaded holes which are formed in extensions formed on the inner portions of the respective halves 6a and 6b are made to agree with each other, and a hinge screw 13 is screwed into the threaded hole to rotatably secure the temple 7 to the side joint 6.

FIG. 7 shows a second embodiment of the connection of the eyeglass frame 1 according to the present invention.

In this embodiment, the same reference numerals are used to denote elements which perform functions similar to those of the elements used in the first embodiment. Although the bar 5 and the bridge 4 are members to be joined, the following explanation refers to the bar 5. The engagement tube 13 is fitted into one end of the bar 5, and the engagement tube 13 is secured by external pinching. Thereafter, one end of the engagement tube 13 is made flat by the application of pressure. A threaded hole 20 is formed in the flat end.

The foregoing refers to the process in which, after the engagement tubes 13 have been secured to the opposite ends of the bar 5, the end of each of the engagement tubes 13 is made flat. Alternatively, after the ends of the respective engagement tubes 13 have been made flat, the threaded holes 20 may be formed to finish the engagement tubes 13 and the engagement tubes 13 may be secured to the opposite ends of the bar 5 by pinching.

The opposite ends of the bar 5 having the above-described arrangement are secured to the engagement portions 8 provided on the upper portions of the respective rims 2 by screws 14 which serve as securing means. In this case, each of the engagement portions 8 has a threaded hole 21 above the rim 2 in such a manner that the threaded hole 21 is adapted to be aligned with a threaded hole 20 formed in the engagement tube 13. After the threaded hole 20 formed in the engagement tube 13 has been made to align with the threaded hole 21, the bar 5 and the rim 2 are secured to each other by the screw 14.

Since the present invention has the above-described arrangement, if parts which differ in length or thickness are prepared as the bar 5 and the bridge 4, a variety of parts which can meet the demands of individual users can be supplied with a driver only.

Even in a case where the bar 5 is made of an NT alloy material, since it is not necessary to directly process the NT alloy material, securing process can be simplified and mass production is enabled.

Although the present invention has been explained with reference to the example in which the NT alloy is used as a material which is extremely difficult to work, another kind of material may be used.

INDUSTRIAL APPLICABILITY

In accordance with the above-described eyeglass frame of the present invention, a bar and rims or a bridge and the rims are connected by engagement tubes formed of a nickel silver or the like, the eyeglass frame of the present invention finds suitable use in the field of eyeglass frames using an NT alloy material having extremely limited solderability.

I claim:

1. An eyeglass frame for a pair of right and left eyeglass lenses, comprising.
    a pair of right and left rims for supporting the eyeglass lenses;
    a bridge member for connecting said rims;
    a bar member secured to upper potions of said rims for reinforcing a connection between said rims;
    a temple member secured to a side portion of each of said rims;
    an anti-rotation groove formed at an end of said bar member; and
    an engagement tube having one end having an inner threaded portion which is engaged with said anti-rotation groove; said engagement tube having another end provided with a flat portion formed thereon, said flat portion including a hole formed therein and said engagement tube being secured to said rim by screw means passing through said hole.

* * * * *